Patented Feb. 15, 1944

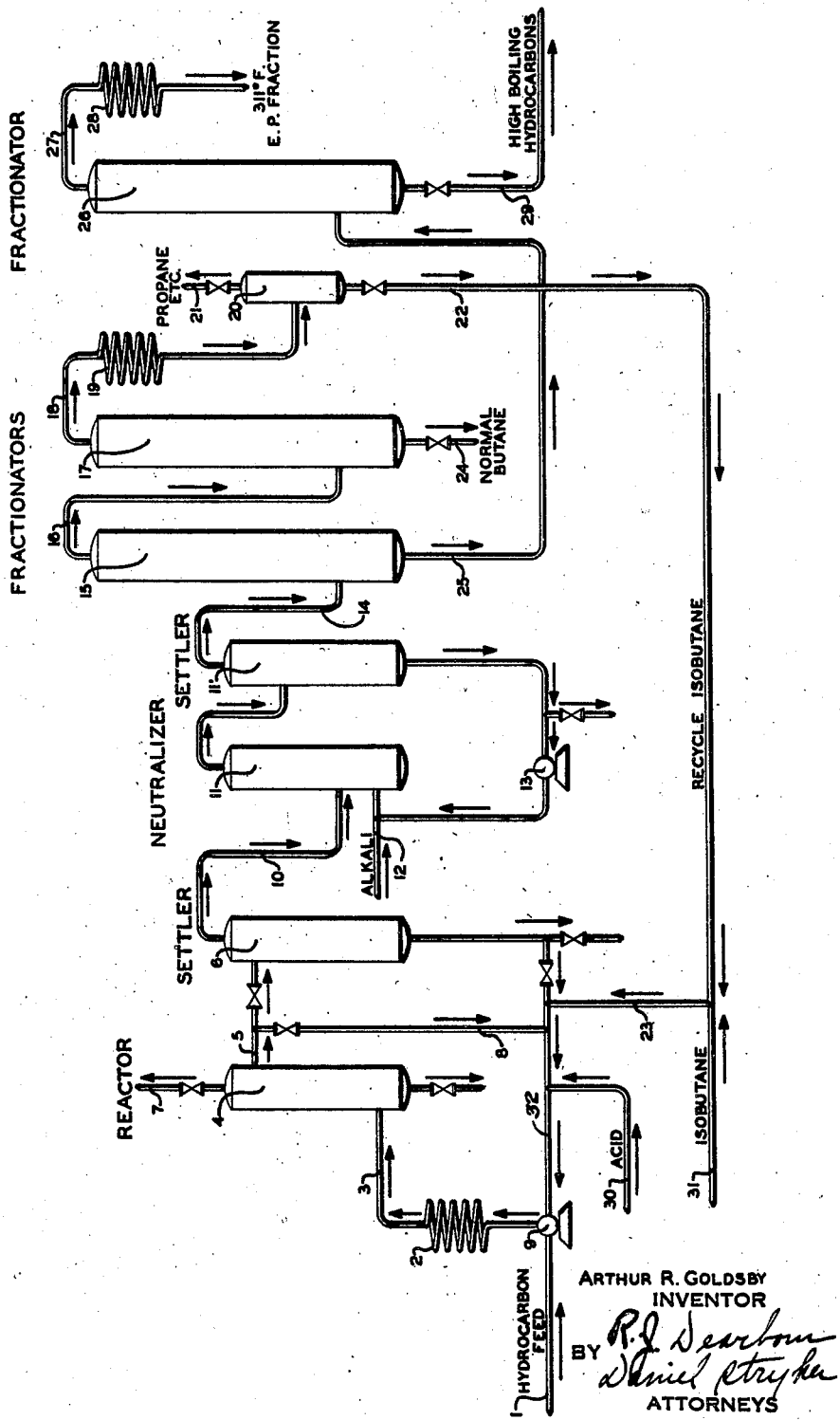

2,341,863

UNITED STATES PATENT OFFICE 2,341,863

ALKYLATION PROCESS

Arthur R. Goldsby, Beacon, N. Y., assignor, by mesne assignments, to The Texas Company, New York, N. Y., a corporation of Delaware Application June 7, 1939, Serial No. 277,796

22 Claims. (Cl. 260—683.4)

This invention relates to the alkylation of olefin hydrocarbons with paraffin hydrocarbons in the presence of an alkylation catalyst such as concentrated sulphuric acid. It has particular application to the manufacture of high anti-knock gasoline hydrocarbons suitable for use in the production of motor fuel.

Broadly, the invention contemplates a process for the alkylation of hydrocarbons wherein olefin and paraffin hydrocarbons are subjected to contact with a liquid alkylation catalyst in a reaction zone. A circulating stream of isoparaffin hydrocarbons and liquid alkylation catalyst is established and maintained in a closed circuit by continuously drawing off a portion of the liquid mixture from the reaction zone and subsequently returning it thereto. The fresh hydrocarbon feed containing olefin hydrocarbons is continuously injected, in the gas phase, in the circulating stream prior to its return to the reaction zone. The products of reaction are withdrawn from the zone of reaction, and unreacted hydrocarbons may be recycled.

In pending application Serial No. 203,238, filed April 21, 1938, now Patent No. 2,211,747, a process of alkylation has been described in which olefin hydrocarbons are alkylated with isoparaffin hydrocarbons in the presence of a catalyst such as concentrated sulphuric acid. As there disclosed, a hydrocarbon mixture containing paraffin and olefin hydrocarbons is brought into contact with the catalyst in one or more reaction vessels. The reaction mixture is drawn off from the alkylation vessel to a separating vessel in which the products of reaction are separated from the used acid. A portion of the mixture of hydrocarbons and acid passing to the separating vessel is continuously recycled to the initial reaction vessel and the fresh hydrocarbon feed containing olefin hydrocarbons is injected into the recycled stream.

The present invention involves a modification of the foregoing process.

It comprises injecting the fresh hydrocarbon feed containing olefin hydrocarbons, while in gaseous phase, in the circulating stream of hydrocarbon and catalyst. Moreover, the circulating stream comprises a large proportion of isoparaffin, preferably in substantial excess of the amount required to alkylate the olefins contained in the feed.

An important object of the invention is the avoidance of polymerization of the olefin hydrocarbons upon coming into contact with the catalyst. Moreover, the method of this invention permits introduction of the fresh hydrocarbon feed while in gaseous form. This may be of considerable advantage, inasmuch as the fresh hydrocarbon feed is usually composed largely of normally gaseous hydrocarbons.

The invention is particularly applicable to the alkylation of olefin hydrocarbons with paraffin hydrocarbons to produce motor fuels. It has been found especially successful in the alkylation of isoparaffins with olefins; for example, the alkylation of isobutane with gaseous or liquid olefins having a boiling point not greatly in excess of the gasoline boiling range. It is within the scope of the invention, however, to alkylate any isoparaffin hydrocarbon, gaseous or liquid, with olefins, gaseous or liquid, in the presence of a fluid catalyst which may be recycled in the system.

Any fluid catalyst effective as an alkylation catalyst may be used. For this purpose concentrated sulphuric acid, containing around 90 to 100% $H_2SO_4$, has been found to be effective. As an example of another catalyst mention may be made of a boron trifluoride-water complex having the formula $BF_3.nH_2O$, where $n$ has a value ranging from about 1 to 1.5.

In order to describe the invention more fully reference will now be made to the accompanying drawing comprising a flow diagram illustrating one method of practicing the process of the invention.

Referring to the drawing, the hydrocarbon feed is conducted from a source not shown through a pipe 1. This hydrocarbon feed comprises, for example, a mixture of olefin and paraffin hydrocarbons, such as the vapor fraction removed overhead when stabilizing a cracked naphtha produced in the commercial cracking of mineral oil for production of gasoline hydrocarbons. Such a fraction may comprise essentially $C_4$ hydrocarbons or a mixture of $C_3$ and $C_4$ hydrocarbons with or without lighter hydrocarbons. It includes a substantial proportion of olefins, such as $C_3$ and $C_4$ olefins, as well as $C_3$ and $C_4$ paraffins, such as propane, normal butane and isobutane, and may include $C_5$ hydrocarbons.

The pipe 1 communicates with the inlet to a cooling coil 2 through which a stream comprising isoparaffin hydrocarbon and sulphuric acid is continuously conducted, as will be explained later.

The liquid mixture leaving the cooling coil 2 passes through a pipe 3 to a reactor 4. The reactor 4 is of such size and capacity as to afford sufficient time for the reaction to proceed to the desired extent. The reaction mixture overflows through a pipe 5 to a settler 6. The reactor may be equipped with a valved gas release pipe 7 for discharge of unabsorbed gases and for control of pressure within the reactor.

A substantial portion of the mixture overflowing from the reactor 4 is passed through a pipe 8 communicating with the suction side of a circulating and agitating pump 9, such as a centrifugal pump, which forces the liquid mixture, in the form of a thoroughly dispersed emulsion, through the cooling coil 2. The discharge of the circulating stream into the reactor provides agitation of the mixture therein, and this may be supplemented therein by additional internal stirrers or agitators.

That portion of the overflow mixture passing to the settler 6 undergoes settling and stratification therein so that catalyst liquid settles to the lower portion thereof. The hydrocarbons separate into an upper layer which is substantially free from acid and comprise products of reaction as well as unreacted hydrocarbons. This upper layer overflows through a pipe 10 to a neutralizing vessel 11. In the vessel 11 the mixture is subjected to contact with an alkali such as caustic soda, introduced through a pipe 12. The neutralized products overflow to a settler 11', where the alkali-sludge settles to the bottom of the vessel 11' and is withdrawn therefrom, provision being made for recirculating a portion of it by a circulating pump 13.

The neutralized product passes through a pipe 14 to a fractionator 15. A vapor fraction comprising isobutane, normal butane and lighter hydrocarbons is removed through pipe 16 leading to a fractionator 17. In the fractionator 17 isobutane and lighter constituents are removed as a vapor fraction through a pipe 18 leading to a condenser 19. Condensate and mixed gas pass to a small fractionator 20, where any propane and lighter gases are separated from the condensed isobutane, the gases passing off overhead through pipe 21. The condensed isobutane is drawn off from the bottom of the fractionator through a pipe 22 communicating with pipe 23 leading to the suction side of the previously mentioned circulating pump 9.

The liquid fraction formed in the bottom of the fractionator 17 comprises normal butane, which is drawn off through a pipe 24. A liquid fraction formed in the bottom of the fractionator 15 is drawn off through a pipe 25 and conducted to a fractionator 26. Conditions are maintained within the fractionator 26 so as to produce a vapor fraction of any desired end boiling point; for example, a fraction suitable for use in the preparation of aviation gasoline and comprising an end boiling point of about 311° F. This fraction is drawn off as a vapor through a pipe 27 and condensed in a condenser 28. The higher boiling constituents accumulating in the bottom of the fractionator 26 are drawn off through a pipe 29.

The fresh sulphuric acid catalyst is drawn from a source not shown through a pipe 30 and injected into the suction side of the circulating pump 9.

Sufficient make-up isobutane, over that introduced with the charge through pipe 1 and the recycled isobutane through the pipe 22, is drawn from a source not shown and passed through a pipe 31 communicating with pipe 23 and through which the added isoparaffin is introduced to the system to maintain the desired high isobutane to olefin ratio.

Preferably, the isobutane or other isoparaffin is injected into the circulating stream of hydrocarbons and acid substantially in advance of the point of introduction of the fresh olefin feed, and preferably on the suction side of the pump 9 so as to be thoroughly emulsified with the acid prior to contact with the olefin stock. In this way the presence of excess isoparaffin in the circulating stream may be assured prior to and during the time that the olefin hydrocarbons come into contact with the acid. Thus, polymerization of the olefin hydrocarbons by the acid is minimized, such that catalyst deterioration is effectively retarded; and olefin polymers which may be formed are alkylated to saturated motor fuel hydrocarbons.

The proportion of reaction mixture from reactor 4 which is recirculated varies between about 10 parts to 25 parts by volume to one part of reaction mixture which is passed to settler 6. The amount of isobutane in the acid-isobutane mixture in the closed circuit can vary from about 3 to 7 parts, or higher by volume, for one part of olefin charged. The acid in the agitated portion of the system exclusive of the settler is preferably maintained from about 0.5 to 2 parts to one part of total hydrocarbon by volume.

Any desired proportion of the used catalyst withdrawn from the bottom of the settler 6 may be passed through a pipe 32 and thus recycled to the reactor 4. That portion not recycled may be drawn off from the system as indicated.

The cooling coil 2 serves to cool the circulating mixture and assist in maintaining the desired temperature by dissipating a portion of the heat of reaction. Also, as a result of passage through the cooling coil thorough agitation is brought about so that intimate mixing between the hydrocarbons and the acid is realized prior to introduction to the reactor 4.

While a single reaction stage has been described, it is intended that a plurality of such reaction stages may be employed, if desired. Either concurrent or countercurrent flow of catalyst and hydrocarbons through the successive stages may be employed while retaining the principle of internal recycling in each stage, as has been described above. In a multistage unit, each stage may be provided with a settler, or there may be only a final settler for the last stage.

Where the catalyst comprises sulphuric acid, it is usually preferable to use an acid having a concentration of about 96 to 100% $H_2SO_4$. The amount of fresh acid added through the pipe 30 may be about $\frac{1}{5}$ to $\frac{1}{20}$ or less of the volume of the total liquid alkylate produced.

The temperature of reaction ranges from around 30 to 100° F. and, preferably, about 60 to 90° F., for $H_2SO_4$; and about 70° F. to 130° F. and, preferably, about 90° F. to 120° F., for the $BF_3.H_2O$ complex.

The pressure in the alkylation reactor and in the recirculating line may vary from approximately atmospheric up to the normal pressures used for $C_4$ or $C_3$ and $C_4$ alkylation, such as about 30 to 100 pounds per square inch gauge.

The olefinic gas may be introduced with or without cooling to the temperature of the alkylation system. Such gas is usually produced in the stabilization of a naphtha fraction produced in commercial cracking operations. The temperatures and pressures prevailing during such stabilization may be somewhat in excess of that employed in the alkylation system. It is contemplated that it may be introduced all or in part directly to the reactor 4.

While several liquid catalysts have been specifically mentioned above, it is to be understood that the invention is also applicable with the use of other catalysts in a fluid or pumpable form which can be recycled in the system, such as a solution or suspension of aluminum chloride or aluminum bromide in the hydrocarbon oil, or an aluminum halide-hydrocarbon complex.

Obviously many modifications and variations of the invention, as hereinbefore set forth, may be made without departing from the spirit and scope thereof, and therefore only such limitations should be imposed as are indicated in the appended claims.

I claim:

1. In a process for alkylating isoparaffin hydrocarbons with olefin hydrocarbons in the presence of a fluid alkylation catalyst, the method comprising maintaining in a reaction vessel a mixture of said hydrocarbons and catalyst under alkylating conditions such that isoparaffins are reacted with olefins and alkylated hydrocarbons are formed, continuously withdrawing from the vessel a quantity of reaction mixture and subsequently returning it to the vessel together with a substantial quantity of catalyst, in a confined stream, injecting in said stream prior to return to the vessel the fresh olefin and paraffin hydrocarbon feed, injecting excess isoparaffin hydrocarbon into said stream prior to introducing the fresh olefin hydrocarbons, withdrawing another portion of reaction mixture from the reaction vessel, and separating alkylated hydrocarbons from the portion so withdrawn.

2. The method according to claim 1 in which the fluid alkylation catalyst comprises concentrated sulphuric acid.

3. In a process for the alkylation of isoparaffin hydrocarbons in the presence of a fluid alkylation catalyst, the method comprising the steps of maintaining a circulating liquid emulsion stream comprising catalyst and isoparaffin in a substantially closed circuit, said circuit comprising in part a restricted zone of fluid flow in a confined stream and in part an enlarged zone, introducing to said restricted zone additional isoparaffin hydrocarbons so as to maintain a substantial excess over that required for reaction with the olefins to be treated, introducing the olefins in gas phase to said stream at a location in the direction of flow of said stream beyond the locus of introduction of said additional isoparaffin such that the additional isoparaffin becomes emulsified with said stream prior to the contact of the said feed olefins therewith, whereby the gaseous feed olefins are absorbed in said flowing stream in the presence of the emulsified excess isoparaffin, the said mixture then flowing to said enlarged zone under conditions such that alkylation of isoparaffin with the olefins occurs, and continuously withdrawing a portion of the circulating stream and separating alkylate therefrom.

4. The process according to claim 3 in which the catalyst comprises concentrated sulphuric acid.

5. In a continuous process for alkylating isoparaffin hydrocarbons with olefin hydrocarbons in the presence of a fluid alkylation catalyst, the steps comprising maintaining a substantial body of catalyst and hydrocarbons undergoing treatment in a reaction stage, continuously withdrawing reaction mixture from said stage, separately removing alkylated hydrocarbons and catalyst from a portion of the withdrawn mixture, discharging the removed catalyst and alkylated hydrocarbons, and recycling another portion of the withdrawn mixture to the reaction stage, subjecting the recycled catalyst and hydrocarbons to turbulent flow in a confined stream prior to return to the reaction stage, introducing additional isoparaffin hydrocarbon into said confined stream to maintain the isoparaffin content thereof substantially in excess of that required for reaction with the olefins, and introducing the feed olefin to said confined stream at a location in the direction of flow of said stream subsequent to the locus of addition of the added isoparaffin such that the added isoparaffin is emulsified with the said stream prior to contact with the said feed olefin.

6. The process according to claim 5 in which the catalyst comprises concentrated sulphuric acid.

7. In a process for the alkylation of isoparaffin hydrocarbons in the presence of a fluid alkylation catalyst, the method comprising the steps of maintaining a circulating liquid emulsion stream comprising catalyst and isoparaffin in a substantially closed circuit, said circuit comprising in part a restricted zone of fluid flow in a confined stream and in part an enlarged zone, introducing to said restricted zone additional isoparaffin so as to maintain a substantial excess over that required for reaction with the olefin to be treated, introducing a hydrocarbon feed including olefin and paraffin hydrocarbons in gas phase to said stream whereby the gaseous feed olefin is absorbed in said stream while in the presence of excess isoparaffin including the added isoparaffin, the said mixture then passing to said enlarged zone under conditions such that isoparaffin is alkylated with the olefin, releasing unabsorbed gases from said enlarged zone, withdrawing a portion of the reaction mixture from said circulating stream, separately removing alkylated hydrocarbons and catalyst from the withdrawn reaction mixture and recycling at least a part of the removed catalyst to the circulating stream.

8. In a process for the continuous alkylation of an isoparaffin in the presence of a liquid alkylation catalyst, to produce gasoline hydrocarbons of high antiknock value, wherein a circulating liquid emulsion stream comprising catalyst and isoparaffin is maintained in a substantially closed circuit comprising a restricted zone of fluid flow in a confined stream and an enlarged zone, fresh feed comprising isoparaffin and olefinic reactants are continuously introduced into said circulating stream with the isoparaffin maintained in substantial molar excess of the equivalent olefin content under conditions whereby the isoparaffin is alkylated with the olefinic reactant to form reaction products comprising gasoline hydrocarbons of high anti-knock value, and a portion of the reaction products are continuously removed from said circulating stream to a settling zone where hydrocarbons are separated from catalyst, the improvement which comprises introducing feed isoparaffin into the restricted zone of said circulating liquid emulsion stream at a point substantially in advance of the introduction of the olefinic reactant into the said restricted zone in the direction of flow of said circulating stream, whereby the feed isoparaffin is emulsified with the catalyst prior to contact with the olefinic reactant.

9. The method according to claim 8, wherein at least a portion of the catalyst separated from the hydrocarbons in the said settling zone is recycled to the said circulating stream, and the feed isoparaffin is introduced into the said catalyst recycle stream and the mixture then introduced into the said circulating emulsion stream.

10. The method according to claim 8, wherein hydrocarbons separated from catalyst in said settling zone are fractionated to separate gasoline hydrocarbons from unreacted excess isoparaffin, and at least a portion of the said excess isoparaffin is recycled to the said circulating stream and also introduced therein at a point in advance of the location of introduction of the olefinic reactant into said circulating stream.

11. The method according to claim 8, wherein hydrocarbons separated from catalyst in said settling zone are fractionated to separate gasoline hydrocarbons from unreacted excess isoparaffin, at least a portion of the said excess isoparaffin is recycled to the said circulating stream, at least a portion of the catalyst separated in said settling zone is also recycled to the said circulating stream, and the recycle isoparaffin, fresh feed isoparaffin and recycle catalyst are mixed and then introduced into and emulsified with said circulating stream prior to the contact of said feed olefinic reactant therewith.

12. The method according to claim 8, wherein hydrocarbons separated from catalyst in said settling zone are fractionated to separate gasoline hydrocarbons from unreacted excess isoparaffin, at least a portion of said excess isoparaffin is recycled to the said circulating stream, a portion of the catalyst separated in said settling zone is also recycled to the said circulating stream, another portion of the catalyst is discharged, fresh acid is introduced to make up for that discharged, and the said recycle isoparaffin, fresh feed isoparaffin, recycle acid and fresh feed acid are all introduced into said circulating stream and emulsified therewith prior to the contact of said feed olefinic reactant therewith.

13. In a process for the continuous alkylation of an isoparaffin in the presence of a liquid alkylation catalyst, wherein feed isoparaffin and olefinic reactants are continuously introduced into a recirculating emulsion stream of catalyst and hydrocarbon, the mixture agitated under conditions such that alkylation of isoparaffin with the olefin reactant occurs, a portion of said reaction products is continuously withdrawn from said recirculating stream to a settling zone where hydrocarbons are separated from catalyst, hydrocarbons are fractionated to separate alkylate and unreacted isoparaffin, and at least a portion of the separated catalyst and unreacted isoparaffin are continuously recycled to said recirculating emulsion stream, the improvement which comprises thoroughly emulsifying the feed isoparaffin and the recycled isoparaffin with said catalyst recycle stream prior to the contact of the said olefinic reactant therewith.

14. The method according to claim 13 wherein the catalyst is strong sulfuric acid of alkylation strength.

15. In a process for the continuous alkylation of an isoparaffin in the presence of a liquid alkylation catalyst to produce gasoline hydrocarbons of high anti-knock value, wherein a circulating liquid emulsion stream comprising catalyst and isoparaffin is maintained in a substantially closed circuit comprising a restricted zone of fluid flow in a confined stream and an enlarged zone with a circulating pump positioned within said restricted zone, feed hydrocarbons including isoparaffin and olefin are continuously introduced into said circulating stream, and agitated therein under conditions whereby isoparaffin is alkylated with the olefin to produce gasoline hydrocarbons of high anti-knock value, and a portion of the circulating stream is continuously withdrawn to a settling zone where hydrocarbons are settled from catalyst, the improvement which comprises introducing the feed olefin in gas phase into said restricted zone at a point adjacent the suction side of said pump, whereby the olefin is absorbed in the circulating stream in the presence of the isoparaffin, and feed isoparaffin is introduced into said restricted zone at a locus sufficiently in advance of said pump in the direction of flow of said stream whereby the feed isoparaffin is emulsified with the catalyst stream prior to contact of the feed olefin therewith.

16. The method according to claim 15, in which the olefin is fed into the circulating stream in a hydrocarbon mixture comprising normally gaseous olefin and paraffin hydrocarbons in the gas phase, and unabsorbed gases resulting from the said mixture in the circulating stream are removed from the latter when the stream reaches said enlarged zone.

17. The method according to claim 15, wherein at least a portion of the catalyst separated in said settling zone is recycled to the circulating stream, and feed isoparaffin is mixed with the recycle catalyst prior to the introduction of the latter into said circulating stream.

18. In the continuous alkylation of an isoparaffin with a normally gaseous olefin in the presence of a liquid alkylation catalyst capable of absorbing said olefin and normally tending to cause polymerization thereof, the improvement which comprises flowing a feed mixture of the said liquid catalyst and the said isoparaffin in liquid phase and free from olefin through a restricted zone of sufficient extent to cause thorough emulsification of the isoparaffin with the liquid catalyst, there being a substantial excess of isoparaffin in the flowing emulsion stream over that required for reaction with olefin subsequently added thereto as hereinafter set forth, then injecting in gas phase a hydrocarbon stream containing the normally gaseous olefin into the thoroughly emulsified isoparaffin-catalyst liquid stream, the gaseous olefin being absorbed in the liquid catalyst in the presence of the emulsified excess of liquefied isoparaffin to minimize polymerization of the absorbed olefin, passing the resulting flowing stream through a reaction zone under alkylating conditions, whereby isoparaffin is alkylated with absorbed olefin in the presence of the said liquid alkylation catalyst, separating from the resulting reaction products alkylate, excess isoparaffin and catalyst, and returning at least a portion of both the separated excess isoparaffin and catalyst to the first-mentioned restricted zone for re-emulsification and reuse in the process.

19. The method according to claim 18, wherein the said hydrocarbon stream in gas phase contains both normally gaseous olefin and paraffin hydrocarbons, and unabsorbed paraffin gases are released from the flowing emulsion stream in said alkylation reaction zone.

20. The method according to claim 18, wherein a portion of the mixed reaction products containing catalyst is withdrawn from said reaction zone and recycled to said restricted zone to form a part of the flowing emulsion stream.

21. In a process for the continuous alkylation of an isoparaffin in the presence of a liquid alkylation catalyst, wherein a recirculating emulsion stream of isoparaffin and liquid alkylation catalyst is established and maintained in a closed circuit, feed isoparaffin and olefin reactant are added thereto and the mixture agitated under conditions such that alkylation of isoparaffin with the olefin reactant occurs, a portion of said reaction products is continuously withdrawn from said recirculating stream to a settling zone where hydrocarbons are separated from the catalyst, and catalyst is added to said recirculating stream to make up for that withdrawn, the improvement which comprises emulsifying at least a portion of the feed isoparaffin with the said added catalyst prior to adding the same to said recirculating stream and prior to contact of said olefin reactant therewith.

22. The method according to claim 21, wherein the added catalyst comprises at least in part catalyst recycled from the said settling zone to the said recirculating stream, and the feed isoparaffin comprises at least in part recycle isoparaffin recovered from said hydrocarbons separated in the said settling zone.

ARTHUR R. GOLDSBY.